United States Patent
Sisney et al.

(10) Patent No.: US 9,593,945 B2
(45) Date of Patent: Mar. 14, 2017

(54) OPTICAL CONFIGURATION FOR A COMPACT INTEGRATED DAY/NIGHT VIEWING AND LASER RANGE FINDING SYSTEM

(71) Applicant: Raytheon Company, Waltham, MA (US)

(72) Inventors: Brent L. Sisney, Allen, TX (US); Robert B. Chipper, Allen, TX (US); John Jackson, Sachse, TX (US)

(73) Assignee: RAYTHEON COMPANY, Waltham, MA (US)

( * ) Notice: Subject to any disclaimer, the term of this patent is extended or adjusted under 35 U.S.C. 154(b) by 888 days.

(21) Appl. No.: 13/901,682

(22) Filed: May 24, 2013

(65) Prior Publication Data
US 2015/0253133 A1  Sep. 10, 2015

(51) Int. Cl.
| | |
|---|---|
| *G01C 3/04* | (2006.01) |
| *G02B 13/14* | (2006.01) |
| *G02B 27/14* | (2006.01) |
| *F41G 1/32* | (2006.01) |
| *G01S 17/02* | (2006.01) |
| *G01S 17/08* | (2006.01) |
| *G01S 7/481* | (2006.01) |
| *F41G 3/06* | (2006.01) |

(Continued)

(52) U.S. Cl.
CPC .............. *G01C 3/04* (2013.01); *F41G 1/32* (2013.01); *F41G 3/065* (2013.01); *F41G 3/165* (2013.01); *G01S 7/4812* (2013.01); *G01S 17/023* (2013.01); *G01S 17/08* (2013.01); *G02B 13/146* (2013.01); *G02B 23/04* (2013.01); *G02B 27/141* (2013.01); *G02B 23/10* (2013.01)

(58) Field of Classification Search
CPC ........ G02B 17/00; G02B 21/00; G02B 23/00; H04N 5/2254
USPC ............................................... 356/3.01–5.15
See application file for complete search history.

(56) References Cited

U.S. PATENT DOCUMENTS

| | | | |
|---|---|---|---|
| 4,949,089 A | | 8/1990 | Ruszkowski, Jr. |
| 6,020,994 A | * | 2/2000 | Cook ................... H04N 5/2254 348/E5.028 |

(Continued)

FOREIGN PATENT DOCUMENTS

JP         H0821878 A     1/1996

*Primary Examiner* — Luke Ratcliffe
(74) *Attorney, Agent, or Firm* — Lando & Anastasi, LLP

(57) ABSTRACT

A compact integrated optical system including an eyepiece, a reflective telescope, and a multi-spectral combiner optically coupled between the reflective telescope and the eyepiece, and configured to direct visible light received via the reflective telescope assembly along a direct view optical path to the eyepiece assembly. In one example, the multi-spectral combiner includes a display that displays a visual representation of the imagery of the viewed scene, and laser range-finder transceiver that transmits and receives a laser beam via the reflective telescope. A pair of beamsplitters is used to separate the imaging optical path from the direct view and laser range-finding optical paths. A blocking device is used to enable laser range-finding capability during daytime viewing of the imaging optical path imagery on the display. The reflective telescope provides a common aperture for the direct view optical path, an imaging optical path, and the laser range-finder transceiver.

19 Claims, 3 Drawing Sheets

(51) Int. Cl.
  *F41G 3/16* (2006.01)
  *G02B 23/04* (2006.01)
  *G02B 23/10* (2006.01)

(56) References Cited

U.S. PATENT DOCUMENTS

2010/0265490 A1  10/2010  Watanabe
2011/0047854 A1   3/2011  Schlierbach

* cited by examiner

OPTICAL CONFIGURATION FOR A COMPACT INTEGRATED DAY/NIGHT VIEWING AND LASER RANGE FINDING SYSTEM

BACKGROUND

Conventional handheld optical systems that contain a direct view optical path along with night viewing and laser range finding capability suffer from several drawbacks and disadvantages. Most currently fielded military handheld devices are multiple aperture systems utilizing refractive or glass components. These systems are heavy due to the number of components needed to support multiple apertures and the use of exclusively refractive optical components, and suffer from boresight retention problems which result in range finding errors. In particular, such systems tend to be too heavy to be operational effective especially when locating relatively small targets, the weight inducing unacceptable hand held jitter. U.S. Pat. No. 6,020,994 to Cook discloses a common aperture solution; however, this system is not scalable in terms of magnification. In addition, in conventional common aperture solutions, additional beamsplitter(s) and blocking mirror/plate (typically positioned at a 45° angle) required to allow the optical paths to share the common aperture force the package width or height to an unacceptable size for many handheld applications. In some larger aperture systems that are not handheld, where large refractive components would make the system expensive and heavy, reflective telescope assemblies have been incorporated to replace the refractive components. However, implementing light weight reflective technology into handheld optical systems has not been accomplished.

SUMMARY OF INVENTION

Aspects and embodiments are directed to an optical configuration that reduces the size and weight of optical systems including a laser range-finder as well as integrated day (particularly direct view) and night viewing capability. As discussed in more detail below, embodiments provide an optical configuration in which a dichroic beamsplitter presently used in state of the art reflective configurations is eliminated, thus allowing for a more compact package. Aspects and embodiments achieve elimination of the dichroic beamsplitter by providing a solution to both allow direct view blocking and enable laser range-finding capability during viewing of the display, as discussed further below.

According to one embodiment, an optical system comprises an eyepiece assembly, a reflective telescope assembly, and a multi-spectral combiner assembly optically coupled between the reflective telescope assembly and the eyepiece assembly and configured to direct visible light received via the reflective telescope assembly along a direct view optical path to the eyepiece assembly. The multi-spectral combiner assembly includes an imaging sub-system configured to receive electromagnetic radiation from the reflective telescope assembly along an imaging optical path and to provide a first signal representative of imagery of a viewed scene, a display coupled to eyepiece assembly and to the imaging sub-system and configured to receive the first signal and to display a visual representation of the imagery of the viewed scene, a laser range-finder transceiver configured to transmit and receive a laser beam via the reflective telescope assembly, a first beamsplitter configured to transmit the electromagnetic radiation from the reflective telescope assembly to the imaging sub-system and to reflect the visible light and a majority of the laser beam, and a second beamsplitter optically coupled to the first beamsplitter and configured to reflect the laser beam, to transmit the visible light to direct the visible light along the direct view optical path to the eyepiece assembly, and to reflect display light from the display along a display optical path to the eyepiece assembly. The reflective telescope assembly provides a common aperture for the direct view optical path, the imaging optical path, and the laser range-finder transceiver. The optical system may be used in a variety of devices, including target location systems, rifle scopes, or other devices, and may be particularly configured for compact, light-weight systems, such as, but not limited to, handheld target location systems.

In one example the multi-spectral combiner assembly further includes a blocking device positioned between the first beamsplitter and the second beamsplitter and configured to block the visible light reflected by the first beamsplitter from reaching the second beamsplitter. In another example the imaging sub-system is a thermal imaging sub-system, and the electromagnetic radiation is infrared radiation. In another example, the blocking device is movable into and out of the direct view optical path between the first and second beamsplitters such that the blocking device is positioned in the direct view optical path and operable to block the visible light during a night viewing mode of the optical system, and is positioned out of the direct view optical path to allow the visible light to reach the second beamsplitter during a day viewing mode of the optical system. The blocking device may be optically transmissive to the laser beam.

In one example the optical system further comprises a laser position sensing assembly, wherein the first beamsplitter is configured to transmit a portion of the laser beam to the laser position sensing assembly. In one example, the display is further configured to display a reticle representing a position of the laser beam within a field of view of the optical system. In another example the reflective telescope assembly includes four mirrors and is configured to produce an intermediate image. The four mirrors may be spherical or aspheric, and at least one of the mirrors may have a freeform surface profile.

In another example, the electromagnetic radiation is at least one of longwave infrared (LWIR) radiation in a wavelength range of approximately 8-12 μm, midwave infrared (MWIR) radiation in a wavelength range of approximately 3-5 μm, shortwave infrared (SWIR) radiation is a wavelength range of approximately 0.9-1.7 μm, near infrared (NIR) radiation in a wavelength range of approximately 0.7-0.9 μm, and a color television spectral band having a wavelength range of approximately 0.4-0.7 μm. In one example the laser beam has a wavelength of approximately 1.54 micrometers.

The multi-spectral combiner assembly may further comprise at least one lens positioned in collimated space in the display optical path and configured to adjust the magnification of the display as viewed through the eyepiece assembly independently of the magnification along the direct view optical path. In one example the multi-spectral combiner assembly further includes a direct view objective optic positioned in the direct view optical path and configured to direct the visible light to the eyepiece assembly.

Another embodiment is directed to a method of providing integrated laser range-finding and day and night viewing capability in an optical system. The method may comprise acts of directing visible light along a direct view optical path from a common aperture to an eyepiece assembly in a day viewing mode of the optical system, receiving infrared radiation along an infrared optical path via the common aperture, displaying infrared imagery produced from the received infrared radiation on a display in a night viewing mode of the optical system, transmitting and receiving a laser beam along a laser path via the common aperture to provide the laser range-finding, separating the infrared optical path from the direct view optical path and laser path using a first beamsplitter, separating the direct view optical path from the laser path using a second beamsplitter, and reflecting display light from the display to the eyepiece assembly with the second beamsplitter in the night viewing mode of the optical system.

In one example the method further comprises blocking the visible light from reaching the eyepiece during the night viewing mode of the optical system. In another example the method further comprises displaying a reticle on the display, the reticle being representative of a position of the laser beam in a field of view of the optical system. In another example the method further comprises magnifying the display as viewed through the eyepiece independently of magnification along the direct view optical path. Receiving the infrared radiation may include receiving at least one of longwave infrared (LWIR) radiation in a wavelength range of approximately 8-12 micrometers (µm), midwave infrared (MWIR) radiation in a wavelength range of approximately 3-5 µm, shortwave infrared (SWIR) radiation is a wavelength range of approximately 0.9-1.7 µm, and near infrared (NIR) radiation in a wavelength range of approximately 0.7-0.9 µm. In another example transmitting and receiving the laser beam includes transmitting and receiving a laser beam having a wavelength of approximately 1.54 micrometers. In another example separating the infrared optical path from the direct view optical path and laser path includes transmitting the infrared radiation through the first beamsplitter, and reflecting the visible light and a majority of the laser beam to the second beamsplitter.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Figure 1:
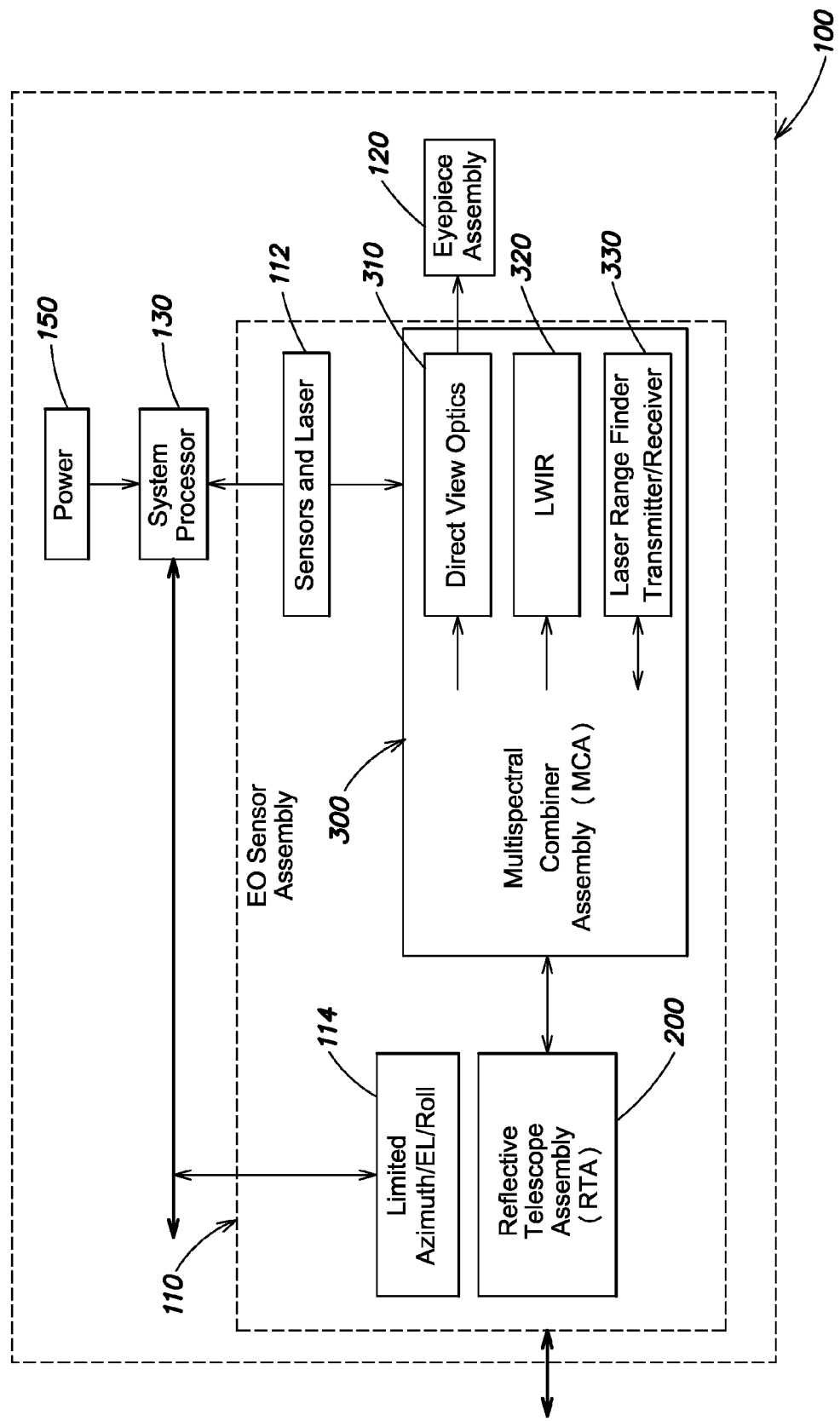
FIG. 1 is a block diagram of one example of a target location system including an optical system according to aspects of the invention.

Aspects and embodiments are directed to an optical configuration for an optical system that incorporates both day viewing (referred to as a direct view optical path) and night viewing (also referred to an infrared optical path or thermal imaging) capability, as well as an integrated laser range-finder. Such an optical system may be used in a variety of devices including, for example, target location systems, rifle scopes, multispectral viewing or imaging systems, and the like. In particular, aspects and embodiments of the optical system discussed herein may be advantageously used in devices where size and weight are of significant concern, including, for example, handheld target location systems. Certain of these devices or systems include an eyepiece that allows a user to directly view a scene through the eyepiece, as well as a display that displays processed infrared imagery to enable night-viewing capability.

The conventional state of the art configuration for such a handheld target location system includes three dichroic beamsplitters that are used to split the day/night optical paths from the laser range-finder, to insert the display path for night-viewing mode, and to add an electronic reticle into the direct view path. Thus, conventionally, a first dichroic beamsplitter transmits the infrared optical path and reflects the direct view optical path and laser range-finder, the second dichroic beamsplitter separates the laser range-finder and the direct view optical path, and the third dichroic beamsplitter provides a combination of the direct view optical path and the display. In contrast, aspects and embodiments eliminate one dichroic beamsplitter and provide a solution that maintains all the capability of conventional systems with only two beamsplitters, thereby allowing for a more compact optical configuration. In particular, certain embodiments provide a solution for accomplishing direct view optical path blocking and laser range-finding capability both during viewing of the night/infrared imagery on the display. In addition, certain embodiments provide for introducing a high brightness reticle overlay for daylight viewing in the direct view optical path. As discussed further below, according to one embodiment a first beamsplitter transmits the infrared optical path and reflects the direct view optical path and laser range-finder, and a second beamsplitter accomplishes the separation of the laser range-finder and direct view optical path as well as providing the direct view optical path and display combination.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Referring to FIG. 1 there is illustrated a block diagram of one example of a target location system 100 in which an integrated multispectral optical system according to aspects and embodiments discussed herein may be used. According to certain embodiments, and as discussed further below, the light-weight configuration of the optical system provides laser range finding, infrared and direct (daytime) scene viewing, as well as minimizing boresight errors between the laser range-finder and the imaging paths. The system includes an electro-optic sensor assembly 110 coupled to an eyepiece assembly 120. The electro-optic sensor assembly 110 is further coupled to a system processor 130 which may also include GPS functionality for self location. The target location system 100 also includes a power supply 150, which may include one or more batteries, for example. The electro-optic sensor assembly 110 further includes angular position sensors 114 configured to provide azimuth, elevation, and roll information of the target location system 100. In certain examples, the components of target location system 100 may be incorporated into a housing (not shown) such that the system is suitable for handheld use.

According to one embodiment, a broadband optical core enables the use of different wavelength optical sensing and viewing paths, and also incorporates the laser range-finder transceiver (laser transmitter and laser receiver) 330 into a compact common aperture. The optical core includes a reflective telescope assembly 200 optically coupled to a multispectral combiner assembly (MCA) 300. The reflective telescope assembly 200 receives and transmits electromagnetic radiation, as discussed further below, and provides the common aperture for the various optical paths of the electro-optic sensor assembly 110. As discussed in more detail below, the multispectral combiner assembly 300 includes optical components forming the direct view optical path (DVO) 310, the infrared (or night vision) optical path 320, and the laser range-finder transceiver 330. In one example the infrared optical path 320 is a longwave infrared (LWIR; typically 8 to 12 µm) optical path suitable for thermal imaging. In other examples, the infrared optical path is configured for one or more of the midwave infrared (MWIR; typically 3 to 5 µm), shortwave infrared (SWIR; typically 0.9 to 1.7 µm), near infrared (NIR; typically 0.7 to 0.9 µm), or color TV (0.4 to 0.7 µm) spectral bands.

The electro-optic sensor assembly 110 also includes various sensors associated with the direct view optical path 310 and infrared optical path 320, and a laser for the laser range-finder, collectively identified as element 112 and coupled to the system processor 130 and to the multispectral combiner assembly 300.

Figure 2:
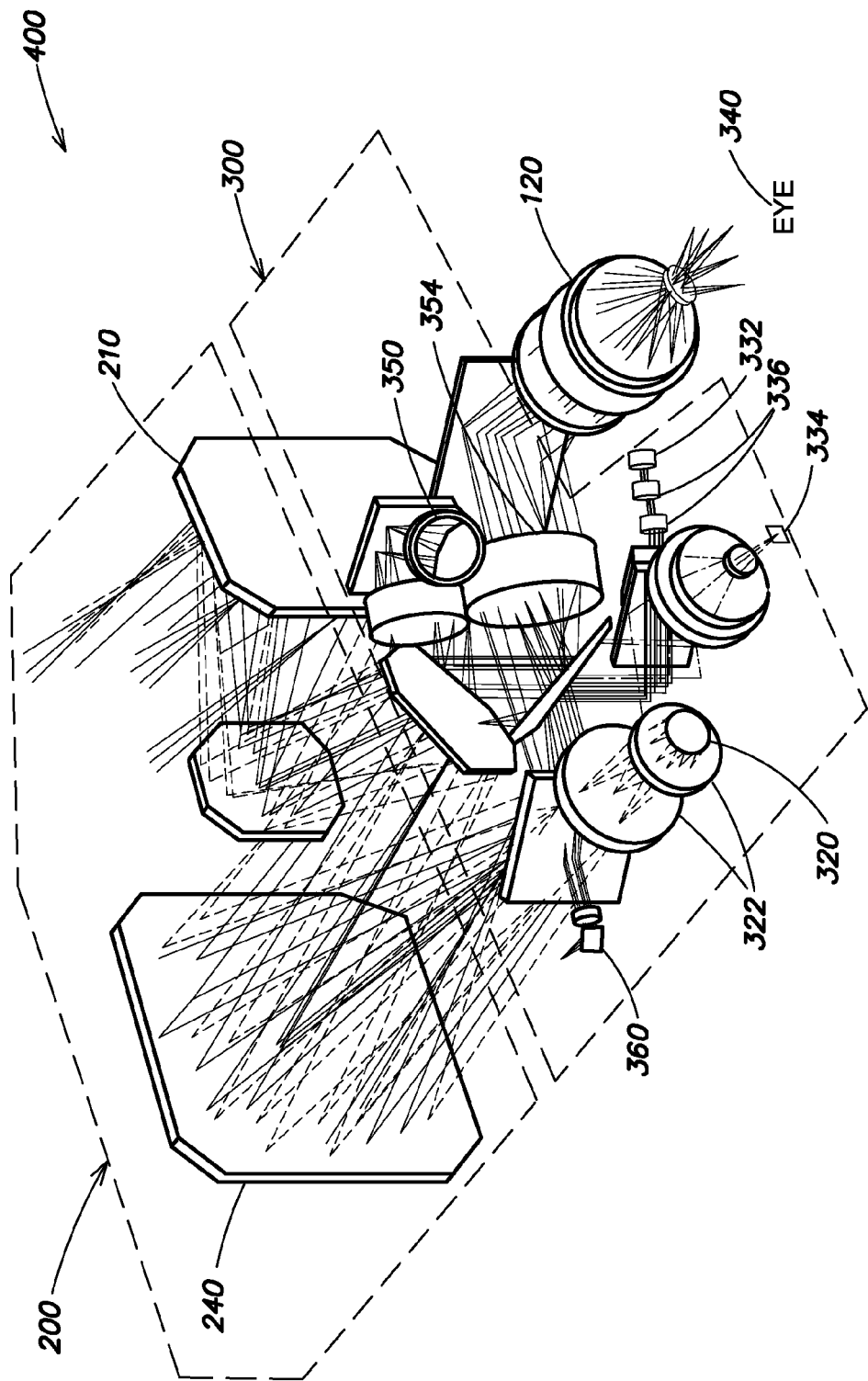
FIG. 2 is a three-dimensional view ray trace of one example of an optical configuration for an embodiment of the optical system which may be used in the target location system of FIG. 1 according to aspects of the invention.

FIG. 2 is a three-dimensional view ray trace of one example of the optical configuration of an optical system 400 which may be used in the target location system 100 or other multispectral optical systems and devices according to one embodiment.

According to one embodiment, broadband radiant and reflected energy received by the reflective telescope assembly 200 is divided between an LWIR (thermal) sensor 320 in the infrared optical path, the direct view optical path which passes through the eyepiece assembly 120 to the eye 340 of a user, and the laser range-finder transmitter 332 and laser range-finder receiver 334 optical paths in the multispectral combiner assembly 300. The eyepiece assembly 120 provides the user the ability to view scenes from the direct view optical path and from the electronic display 350.

The reflective telescope assembly 200 provides both high magnification for long-range target recognition and greater stability for retaining boresight alignment of the multiple common optical paths. In one embodiment, the reflective telescope assembly 200 includes four mirrors, namely a primary mirror 210, a secondary mirror 220, a folding tertiary mirror 230, and a quaternary mirror 240. The mirrors 210, 220, 230, and 240 may be spherical or aspheric, and one or more of the mirrors may have a freeform (also referred to as anamorphic) surface profile. As used herein the term freeform, or anamorphic, refers to a surface profile that is not rotationally symmetric. In one example, all four mirrors of the reflective telescope assembly 200 are aspheric, three having a freeform surface profile. However, those skilled in the art will appreciate, given the benefit of this disclosure, that numerous optical configurations for the reflective telescope assembly 200 may be implemented, provided that the telescope includes four mirrors (for proper image orientation at the entrance aperture of the multispectral combiner assembly 300 without requiring prism assemblies) and produces an intermediate image. In one embodiment, the mirrors 210, 220, 230, and/or 240 are made of a multispectral reflective lightweight optic technology material (MeRLOT™). The mirrors 210, 220, 230, and/or 240 may be figure corrected using magnetorheological finishing and other finishing processes to achieve high quality, precision surfaces, and may be assembled using interferometric alignment techniques.

Figure 3:
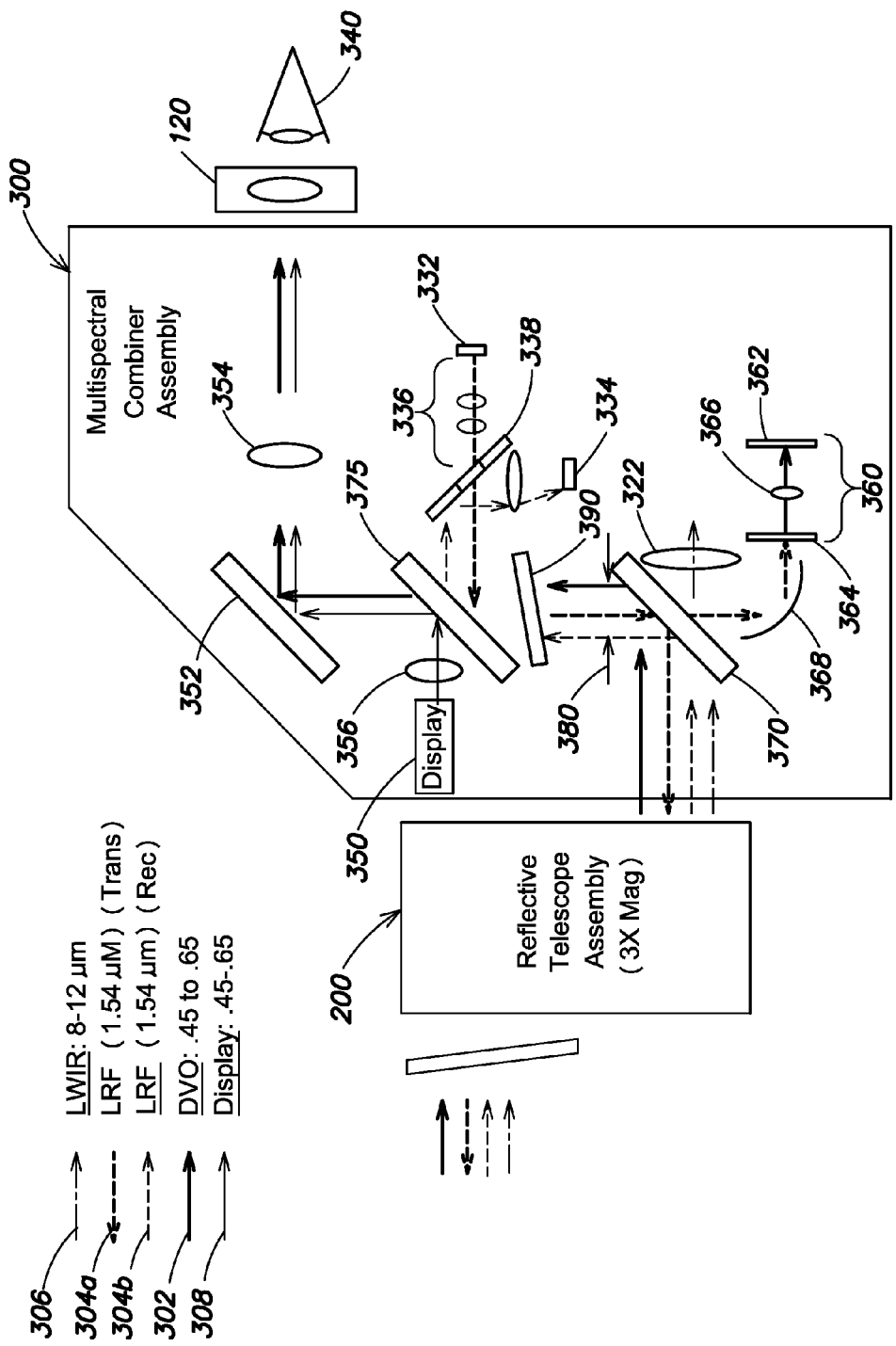
FIG. 3 is an optical block diagram of the ray trace shown in FIG. 2.

FIG. 3 is an optical block diagram illustrating an example of the optical paths within the multispectral combiner assembly 300. Path 302 represents the direct view optical path. In one example, the components of the direct view optical path 302 are configured to transmit visible light in a wavelength range of approximately 0.45 micrometers (µm) to 0.65 µm. Path 304a represents the laser range-finder transmit path, and path 304b represents the laser range-finder receive path. In one example, the laser range-finder is configured to transmit and receive a laser beam having a wavelength of approximately 1.54 µm. Path 306 represents the infrared imaging path, or night viewing path. As discussed above, in one example, the infrared imager components are configured for thermal imaging, for example, using longwave infrared (LWIR) electromagnetic radiation in a wavelength range of approximately 8-12 µm; although the infrared imager components may be configured for other spectral bands. Path 308 represents the display path. The display 350 displays visible light, for example, in the wavelength range of approximately 0.45-0.65 µm. A fold mirror 352 may be used to direct the direct view optical path 302 and display path 308 towards the eyepiece assembly 120 (and eye 340), if necessary depending on the packaging of the various components within a housing of the system or device in which the optical system 400 is being used.

In the infrared imaging path, the multispectral combiner assembly 300 includes an LWIR refractive imager 322, which may include one or more optical components (such as mirrors or lenses) and an infrared imaging detector, such as a focal plane array or microbolometer array, configured to perform thermal imaging, as is understood by those skilled in the art. Infrared imagery obtained from the imager 322 is processed, and a visual representation thereof is then displayed by the display 350. In this manner, night vision capability is provided to the user, as is well understood by those skilled in the art. In one example, the display 350 is a high brightness dual color display.

The laser range-finder transceiver 330 includes a laser transmitter 332 and a laser receiver 334. The laser transmitter 332 may be coupled to a beam expander 336 that magnifies the laser range-finder beam. In one example, the beam expander 336 provides approximately 13.3× magnification. A hole mirror 338 is positioned to direct the laser range-finder receive path 304b to the laser receiver 334 and such that the laser range-finder transmit beam passes through the hole in the mirror 338, as shown in FIG. 3. In one example the laser receiver 334 has approximately a 1 mrad field of view (FOV).

According to one embodiment, a first beamsplitter 370 allows the infrared radiation in the infrared optical path 306 to pass through (be transmitted) to the LWIR imager 322. The first beamsplitter 370 reflects a majority of the laser range-finder beam (as shown by paths 304a and 304b), but allows a small portion of the beam in the transmit path 304a to pass through to a laser position sensing assembly 360. The laser position sensing assembly 360 determines laser beam angular movement and allows for electronic reticle compensation, as discussed further below. The second beamsplitter 375 allows the direct view optical path to be both transmitted and reflected, and also reflects the laser range-finder transmitter and receiver energy to and from the reflective telescope assembly 200, as shown in FIG. 3. This configuration provides the minimal number of beamsplitters (two) and requires no heavy glass or reverting prism assemblies to correct image orientation at the eyepiece. A system aperture stop 380 is formed between the first and second beam splitters 370, 375. The transmissive and reflective behavior of the first and second beamsplitters 370, 375 at the different wavelengths associated with the different functions and optical paths of the optical system 400 may be controlled by appropriate selection of the materials used to form the beamsplitters and/or by coating the beamsplitters with one or more wavelength-selective coatings.

A direct view path blocking device 390 may be used to selectively block the direct view optical path from reaching the user's eye 340. For example, when the user is viewing the infrared imagery displayed by the display 350, it may be preferable to block the direct view optical path to prevent bright objects from appearing "overlayed" on the infrared imagery which could cause confusion or prevent the user from seeing important features in the infrared imagery. The blocking device 390 may be movable, such that its position may be shifted (for example, under control of the user, optionally via the system processor 130) into and out of the direct view optical path. In one example, the blocking device 390 is configured to be optically opaque to the visible light wavelengths of the direct view optical path, but optically transparent, or at least sufficiently transmissive, to the wavelength of the laser range-finder beams to allow operation of the laser range-finder in either the direct view (e.g., daylight viewing) mode or thermal imaging (e.g., night viewing) mode of the system 400. This may be achieved through appropriate selection of the materials used to form the blocking device 390 and/or by coating the blocking device with one or more wavelength-selective coatings.

As discussed above, the display 350 is used to display a visual representation of the infrared imagery obtained using the infrared imager 322. The display 350 may further display data, such as targeting data and other information, as well as laser range-finder beam position graphics. In addition, while the user is viewing either the infrared imagery or the direct view optical path, the display 350 may provide a reticle overlay onto the viewed scene. In one example, the reticle represents where the laser range-finder transmit beam (path 304a) is oriented in the field of view of the optical system. As discussed above, the system 400 may include a laser position sensing assembly 360. In one example, the laser position sensing assembly is used to determine laser beam angular movement and reticle compensation. Referring to FIG. 3, the laser position sensing assembly may include a position sensor 362, such as a CMOS position sensor, for example, together with a phosphor disk 364 and focusing and/or filtering optics 366. A mirror 368 may be used to direct and focus the portion of the laser transmit beam (in path 304a) transmitted through the first beamsplitter 370 to the position sensing assembly 360.

As discussed above, certain common aperture conventional target location systems are not easily scalable in terms of system magnification and display format. For example, in the system disclosed in U.S. Pat. No. 6,020,994 the format of the display and the eyepiece power are tied together, such that if the display format is changed, the eyepiece power must necessarily changed as well. As a result, if the eyepiece is fixed, the size of the remaining system optical components must be increased in order to achieve higher magnification. In contrast, embodiments of the optical system 400 allow for the system magnification to be altered at least partially independently of the eyepiece power and display format by only changing the display optic 356. Referring to FIG. 3, one or more lenses 356 may be included in the collimated display path 308 to allow the magnification of the display 350 (as viewed through the eyepiece 120) to be changed. Element 354 is the DVO objective which when combined with the eyepiece optics creates a secondary telescope.

Thus, aspects and embodiments provide a light weight, single aperture configuration for a handheld target location system providing laser range finding, infrared (e.g., LWIR) and direct (e.g., daylight) scene viewing. Use of a common aperture minimizes boresight errors between the laser range-finder paths 304a, 304b and the infrared/direct paths 306, 302. In addition, the use of primarily reflective optical elements, rather than refractive elements, and only two beamsplitters rather than the conventional three or more, reduces the size and weight of the system.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An optical system comprising:
   an eyepiece assembly;
   a reflective telescope assembly; and
   a multi-spectral combiner assembly optically coupled between the reflective telescope assembly and the eyepiece assembly and configured to direct visible light received via the reflective telescope assembly along a direct view optical path to the eyepiece assembly, and including:
   an imaging sub-system configured to receive electromagnetic radiation from the reflective telescope assembly along an imaging optical path and to provide a first signal representative of imagery of a viewed scene;
   a display coupled to the eyepiece assembly and to the imaging sub-system and configured to receive the first signal and to display a visual representation of the imagery of the viewed scene;

a laser range-finder transceiver configured to transmit and receive a laser beam via the reflective telescope assembly;

a first beamsplitter configured to transmit the electromagnetic radiation from the reflective telescope assembly to the imaging sub-system and to reflect the visible light and a majority of the laser beam;

a second beamsplitter optically coupled to the first beamsplitter and configured to reflect the laser beam, to transmit the visible light to direct the visible light along the direct view optical path to the eyepiece assembly, and to reflect display light from the display along a display optical path to the eyepiece assembly; and a blocking device positioned between the first beamsplitter and the second beamsplitter and configured to block the visible light reflected by the first beamsplitter from reaching the second beamsplitter;

wherein the reflective telescope assembly provides a common aperture for the direct view optical path, the imaging optical path, and the laser range-finder transceiver.

2. The optical system of claim 1, wherein the imaging sub-system is a thermal imaging sub-system, and the electromagnetic radiation is infrared radiation.

3. The optical system of claim 1, wherein the blocking device is movable into and out of the direct view optical path between the first and second beamsplitters such that the blocking device is positioned in the direct view optical path and operable to block the visible light during a night viewing mode of the optical system, and is positioned out of the direct view optical path to allow the visible light to reach the second beamsplitter during a day viewing mode of the optical system.

4. The optical system of claim 3, wherein the blocking device is optically transmissive to the laser beam.

5. The optical system of claim 1, further comprising:
a laser position sensing assembly; and
wherein the first beamsplitter is configured to transmit a portion of the laser beam to the laser position sensing assembly.

6. The optical system of claim 5, wherein the display is further configured to display a reticle representing a position of the laser beam within a field of view of the optical system.

7. The optical system of claim 1, wherein the reflective telescope assembly includes four mirrors and is configured to produce an intermediate image.

8. The optical system of claim 7, wherein each of the four mirrors is aspheric, and wherein at least one of the four mirrors has a freeform surface profile.

9. The optical system of claim 1, wherein the electromagnetic radiation is at least one of longwave infrared (LWIR) radiation in a wavelength range of approximately 8-12 μm, midwave infrared (MWIR) radiation in a wavelength range of approximately 3-5 μm, shortwave infrared (SWIR) radiation is a wavelength range of approximately 0.9-1.7 μm, near infrared (NIR) radiation in a wavelength range of approximately 0.7-0.9 μm, and a color television spectral band having a wavelength range of approximately 0.4-0.7 μm.

10. The optical system of claim 1, wherein the laser beam has a wavelength of approximately 1.54 micrometers.

11. The optical system of claim 1, wherein the multi-spectral combiner assembly further comprises at least one lens positioned in collimated space in the display optical path and configured to adjust a magnification of the display as viewed through the eyepiece assembly independently of a magnification along the direct view optical path.

12. The optical system of claim 1, wherein the multi-spectral combiner assembly further includes a direct view objective optic positioned in the direct view optical path and configured to direct the visible light to the eyepiece assembly.

13. A method of operating an optical system to provide integrated laser range-finding and day and night viewing capability, the method comprising:
directing visible light along a direct view optical path from a common aperture to an eyepiece assembly in a day viewing mode of the optical system;
receiving infrared radiation along an infrared optical path via the common aperture;
displaying infrared imagery produced from the received infrared radiation on a display in a night viewing mode of the optical system;
transmitting and receiving a laser beam along a laser path via the common aperture to provide the laser range-finding;
separating the infrared optical path from the direct view optical path and laser path using a first beamsplitter;
separating the direct view optical path from the laser path using a second beamsplitter;
blocking the visible light from reaching the eyepiece assembly during the night viewing mode of the optical system; and
reflecting display light from the display to the eyepiece assembly with the second beamsplitter in the night viewing mode of the optical system.

14. The method of claim 13, further comprising displaying a reticle on the display, the reticle being representative of a position of the laser beam in a field of view of the optical system.

15. The method of claim 13, further comprising magnifying the display as viewed through the eyepiece independently of magnification along the direct view optical path.

16. The method of claim 13, wherein receiving the infrared radiation includes receiving at least one of longwave infrared (LWIR) radiation in a wavelength range of approximately 8-12 micrometers, midwave infrared (MWIR) radiation in a wavelength range of approximately 3-5 μm, shortwave infrared (SWIR) radiation in a wavelength range of approximately 0.9-1.7 μm, and near infrared (NIR) radiation in a wavelength range of approximately 0.7-0.9 μm.

17. The method of claim 13, wherein transmitting and receiving the laser beam includes transmitting and receiving a laser beam having a wavelength of approximately 1.54 micrometers.

18. The method of claim 13, wherein separating the infrared optical path from the direct view optical path and laser path includes transmitting the infrared radiation through the first beamsplitter, and reflecting the visible light and a majority of the laser beam to the second beamsplitter.

19. An optical system comprising:
an eyepiece assembly;
a reflective telescope assembly;
a multi-spectral combiner assembly optically coupled between the reflective telescope assembly and the eyepiece assembly and configured to direct visible light received via the reflective telescope assembly along a direct view optical path to the eyepiece assembly, and including:
an imaging sub-system configured to receive electromagnetic radiation from the reflective telescope assembly along an imaging optical path and to provide a first signal representative of imagery of a viewed scene;

a display coupled to the eyepiece assembly and to the imaging sub-system and configured to receive the first signal and to display a visual representation of the imagery of the viewed scene;

a laser range-finder transceiver configured to transmit and receive a laser beam via the reflective telescope assembly;

a first beamsplitter configured to transmit the electromagnetic radiation from the reflective telescope assembly to the imaging sub-system and to reflect the visible light and a majority of the laser beam; and a second beamsplitter optically coupled to the first beamsplitter and configured to reflect the laser beam, to transmit the visible light to direct the visible light along the direct view optical path to the eyepiece assembly, and to reflect display light from the display along a display optical path to the eyepiece assembly; and a laser position sensing assembly, wherein the first beamsplitter is configured to transmit a portion of the laser beam to the laser position sensing assembly;

wherein the reflective telescope assembly provides a common aperture for the direct view optical path, the imaging optical path, and the laser range-finder transceiver.

\* \* \* \* \*